United States Patent [19]

Okada et al.

[11] Patent Number: 4,563,290

[45] Date of Patent: Jan. 7, 1986

[54] WATER-SOLUBLE COPOLYMERS USEFUL FOR ENHANCED OIL RECOVERY

[75] Inventors: Masashi Okada, Nagaokakyo; Kimihiko Noda, Uji; Masami Shikata, Otsu, all of Japan

[73] Assignee: Sanyo Chemical Industries, Ltd., Kyoto, Japan

[21] Appl. No.: 608,100

[22] Filed: May 8, 1984

[30] Foreign Application Priority Data

Jun. 1, 1983 [JP] Japan ................................. 58-98687

[51] Int. Cl.$^4$ ............................................. C09K 3/00
[52] U.S. Cl. ............................... 252/8.55 D; 526/287
[58] Field of Search ................ 166/274, 275; 526/287; 252/8.55 D

[56] References Cited

U.S. PATENT DOCUMENTS

| | | | |
|---|---|---|---|
| 3,804,173 | 4/1974 | Jennings | 166/275 |
| 3,858,652 | 1/1975 | Rhudy et al. | 166/274 |
| 4,163,476 | 8/1979 | Tate | 166/274 |
| 4,309,523 | 1/1982 | Engeihardt | 526/287 |
| 4,404,111 | 8/1983 | Bi et al. | 526/287 |
| 4,471,097 | 8/1984 | Uhl et al. | 526/287 |

FOREIGN PATENT DOCUMENTS 437281  5/76  United Kingdom .

*Primary Examiner*—Theodore Morris
*Attorney, Agent, or Firm*—Oblon, Fisher, Spivak, McClelland & Maier

[57] ABSTRACT

Water-soluble copolymers of 10–30 mole % of (meth)acrylic acids, 1–10 mole % of sulfo group-containing (meth)acrylic monomers and 60–89 mole % of (meth)acrylamides, which copolymers have inherent viscosity of 10–25 dl/g, have improved mechanical shear stability and improved viscosity-increasing property even under contact with water containing impurities and are used for enhanced oil recovery.

21 Claims, No Drawings

WATER-SOLUBLE COPOLYMERS USEFUL FOR ENHANCED OIL RECOVERY

BACKGROUND OF THE INVENTION

1. Field of the Invention

This invention relates to water-soluble copolymers. More particularly, it relates to water-soluble copolymers useful for enhanced oil recovery.

2. Description of the Prior Art

Heretofore, there have been known, as viscosity improvers used for enhanced oil recovery, water-soluble polymers, such as copolymers of acrylamide, acrylic acid or salt thereof, and N-sulfoethyl- or sulfopropyl-acrylamide or -methacrylamide. Certain of such polymers, however, have tendency of being degraded under mechanical shearing or resulting in poor viscosity-increasing property when contacted with water containing traces of impurities.

SUMMARY OF THE INVENTION

Accordingly, it is one object of the present invention to provide a water-soluble polymer having improved mechanical shear stability.

It is another object of this invention to provide a polymer having improved viscosity- increasing property even under contact with water containing traces of impurities.

Still another object of the invention is to provide a process for increasing the yield of petroleum using such a water-soluble polymer.

Briefly, these and other objects of this invention as hereinafter will become more readily apparent have been attained broadly by providing a water-soluble copolymer having at least one copolymerized unit (a) of the general formula:

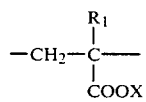  (1)

wherein $R_1$ is H or methyl radical and X is a counter cation; at least one copolymerized unit of the general formula:

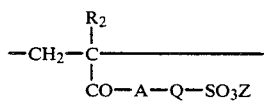  (2)

wherein $R_2$ is H or methyl radical, A is NH or O, Q is a divalent hydrocarbon radical containing at least four carbon atoms and Z is a counter cation; and at least one copolymerized unit of the general formula:

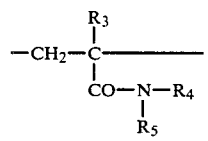  (3)

wherein $R_3$, $R_4$ and $R_5$ are, independently, H or methyl radical, which polymer has an inherent viscosity of 10–25 dl/g.

DETAILED DESCRIPTION OF THE PREFERRED EMBODIMENT

Suitable counter cations, X in the general formula (1) and Z in the general formula (2), which may be the same or different, include, for example, hydrogen; alkali metals, such as sodium, potassium and the like; ammonium and lower organic amine cations, such as methyl amine, ethyl amine, ethanol amine, triethanol amine and the like. Among these, preferred are alkali metals, particularly sodium and potassium, and ammonium. The most preferred is sodium.

It is essential in the present invention that the divalent hydrocarbon radical Q in the general formula (2) contains at least four carbon atoms. Suitable hydrocarbon radicals include $C_4$–$C_8$ aliphatic, $C_4$–$C_{10}$ alicyclic and $C_6$–$C_{15}$ aromatic hydrocarbon radicals. Preferred examples of these are:

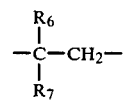

wherein $R_6$ is a lower alkyl radical containing 1–4 carbon atoms (methyl, ethyl, n- or i-propyl, or n-, i-, s- or t-butyl), and $R_7$ is a lower alkyl radical as above or an aryl radical (such as phenyl). In the above, the carbon atom having the substituents $R_6$ and $R_7$ is linked to A (NH or O) in the general formula (2), and the methylene radical is linked to sulfo group. Other examples of said radical Q are branched or straight-chain alkylene radicals, such as

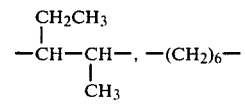

and the like; cycloalkylene radicals, such as

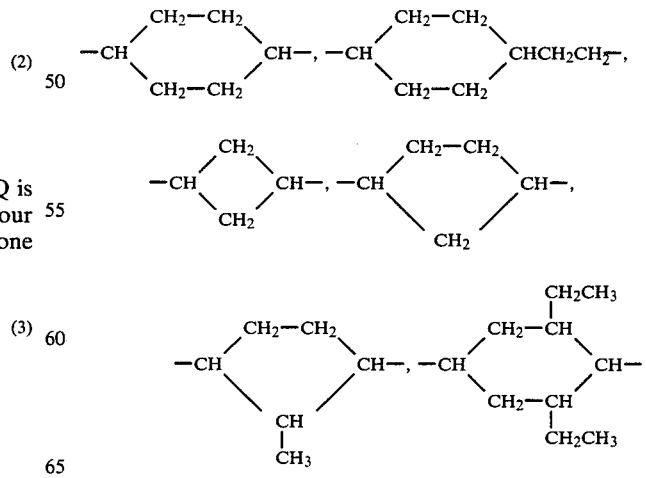

and the like; arylene radicals, such as o-, m- and p-phenylene radicals; and aralkylene radicals, such as

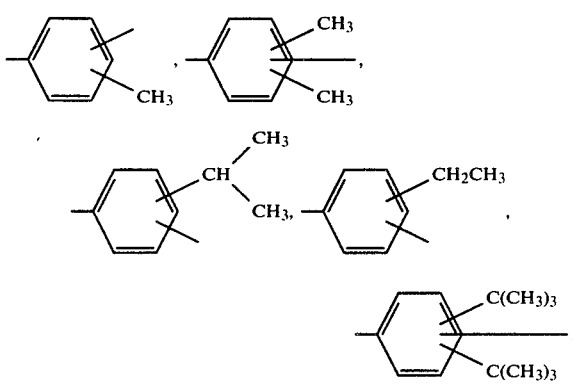

and the like. Among these hydrocarbon radicals, preferred are alkylene radicals and aralkylene radicals, particularly the above ethylene radicals substituted with $R_6$ and $R_7$. The most preferred is:

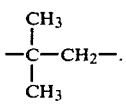

Water-soluble copolymers according to this invention can be produced by copolymerization of (A) at least one carboxyl-containing monomer of the general formula:

(B) at least one sulfo-containing monomer of the general formula:

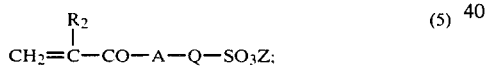

and (C) at least one amide-containing monomer of the general formula:

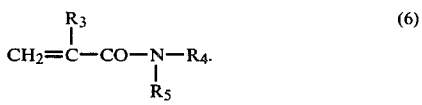

In the above formulae, $R_1$, $R_2$, $R_3$, $R_4$, $R_5$, X, A, Q and Z are the same as in the formulae (1), (2) and (3).

Suitable carboxyl-containing monomers (A) are acrylic acid and methacrylic acid, hereinafter referred to as "(meth) acrylic acids"(similar notations being used hereinafter); and salts thereof, such as alkali metal-, ammonium- or lower organic amine-salts. Preferred are acrylic acid and salts thereof.

Examples of suitable amide-containing monomers (C) are (meth)acrylamides and N,N-dimethyl(meth)acrylamide. Preferred are (meth)acrylamide, particularly acrylamide.

Suitable sulfo-containing monomers (B) include, for example, sulfo group-containing (meth)acrylamides, such as 2-(meth)acrylamido-2-methyl-propane sulfonic acids, 2-(meth)acrylamido-2-phenyl-propane sulfonic acids, p-(meth)acrylamidomethyl-benzene sulfonic acids, 2-(meth)acrylamido-2-phenyl-ethane sulfonic acids, and the like; and sulfo group-containing (meth)acrylates, such as 2-(meth)acryloyloxy-2,2-dimethyl-ethane sulfonic acids, p-(meth)acryloyloxymethylbenzene sulfonic acids, and the like; as well as salts thereof, such as alkali metal-, ammonium- and lower organic amine salts. Among these, preferred are sulfo group-containing (meth)acrylamides, particularly 2-(meth)acrylamido-2-methylpropane sulfonic acids, and salts of them. Most preferred are 2-acrylamido-2-methyl-propane sulfonic acid (hereinafter referred to as AMPS) and salts thereof.

Water-soluble copolymers of the invention may contain at least one additional copolymerized unit (d), derived from one or more copolymerizable monoethylenically unsaturated monomers (D). Suitable copolymerizable monomers include, for instance, monoethylenically unsaturated hydrocarbons, esters, amides, nitriles, alcohols, ethers, carboxylic acids and salts thereof, and sulfonic acids and salts thereof, other than the above monomers (A), (B) and (C). Illustrative examples of these monomers (D) are olefines, such as ethylene, propylene, butylene, isobutylene, $C_5$–$C_{20}$ alpha-olefines (such as nonene), aromatic hydrocarbons, such as styrene, alpha-alkyl-styrene (such as alpha-methyl-styrene), vinyltoluenes, and the like; esters of monoethylenically unsaturated mono- or poly-carboxylic acids (such as (meth)acrylic, maleic, itaconic acids and the like) with monohydric alcohols (such as $C_1$–$C_{18}$ alkanols and cycloalkanols) or polyols (such as $C_2$–$C_4$ alkylene glycols and polyalkyleneglycols), for example, methyl-, ethyl-, 2-ethylhexyl, dodecyl-, stearyl-(meth)acrylates, diethyl maleate, hydroxyethyl-, hydroxypropyl-(meth)acrylates, triethyleneglycol (meth)acrylates and the like, and esters of monoethylenically unsaturated alcohols (such as vinyl and (meth)allyl alcohols), for example, vinyl acetate, vinyl propionate, (meth)allyl acetates, and the like; vinyl lactams, such as N-vinyl pyrrolidone, N-mono- or di- $C_2$–$C_4$ alkyl- or $C_1$–$C_4$ hydroxyalkyl-(meth)acrylamides, such as N-ethyl-, N-hexyl-, N,N'-diethyl-, N,N'-di-n-propyl-, N-methylol-, N-hydroxyethyl-, N,N'-dihydroxyethyl(meth)acrylamides, and the like; (meth)acrylonitriles; (meth)allyl alcohols; ethers (such as vinyl and (meth)allyl ethers) of mono- or polyols (such as $C_1$–$C_{18}$ alkanols, $C_2$–$C_4$ alkylene glycols, poly- $C_2$–$C_4$ alkyleneglycols, and the like), for instance, vinyl ethyl ether, vinyl propyl ether, vinyl i-butyl ether, (meth)allyl ethyl ether, poly(oxyethyleneoxypropylene)glycol mono(meth)allylethers, and the like; mono- or poly-carboxylic acids, such as crotonic, cinnamic, vinylbenzoic, maleic, fumaric, itaconic, citraconic, mesaconic, methylenemalonic and aconitic acids, and their salts (such as alkali metal-, ammonium- and amine-salts); aliphatic or aromatic vinyl sulfonic acids, such as (meth)allyl-, vinyl-, styrene-, vinyltoluene-sulfonic acids, 2-hydroxy-3-(meth)allyloxypropane-sulfonic acids and the like, sulfo group-containing (meth)acrylic monomers, such as sulfoethyl-, sulfopropyl-(meth)acrylates and -(meth)acrylamides, 2-hydroxy-3-(meth)acryloyloxypropyl sulfonic acids and the like, and their salts (such as alkali metal-, ammonium- and amine salts); and halides, such as vinyl chloride, vinylidene chloride, and the like.

In the present invention, contents of said units (a), (b) and (c) in water-soluble copolymers are important. Content of (a) is usually 10–30 mole % preferably 13–28% more preferably 16–25%, that of (b) is usually 1–10% preferably 2–9% more preferably 2–8%, and that of (c) is usually 60–89% preferably 63–85% more preferably 67–82%, based on the mole of the total monomer units. Copolymers containing less than 1% of (b) have poor resistance to salts as impurities contained in water. When content of (b) is over 10%, inherent viscosity of the resulting polymers cannot be raised sufficiently. Use of less than 10% of (a) results in lower inherent viscosity and lower viscosity of aqueous polymer solutions. When (a) is contained in excess of 30%, the resulting polymers have poor compatibility to water containing salts and are liable to form precipitates in contact with metal ions such as calcium ion in water. Presence of at least 1% of (b) and at least 10% of (a) gives improved mechanical shear stability.

Content of said additional copolymerized unit (d) is generally 0–20% preferably 0–10%. In case where sulfo group-containing unit or calboxyl group-containing unit, or both are contained in (d), total amount of the sulfo group-containing unit and (b) is not more than 10% and that of the carboxyl group-containing unit and (a) is not more than 30%. Content of hydrophobic copolymerized unit is limited to such an amount as to provide water-soluble copolymers, for instance, 0–10% preferably 0–5%.

Water-soluble copolymers according to this invention may be produced by direct copolymerization of said carboxyl-containing monomer (A), said sulfo-containing monomer (B) and said amide-containing monomer (C) with or without one or more other monomers (D); or by copolymerizing these monomers, at least a part of which is substituted with at least one precursor thereof, followed by modifying the copolymerized precursor units in the resulting polymers into copolymerized units of any of the monomers (A), (B) and (C). For example, polymers containing said unit (a) can be obtained by partially hydrolyzing amide groups of copolymers of (C) and (B), or by hydrolysis or partial hydrolysis of copolymers of (meth)acrylic esters, such as methyl (meth) acrylates, with (B). Polymers containing said unit (b) may be prepared by sulfoalkylation of copolymers of (C) and (A). Polymers containing said units (a) and (b) in the form of salts can be obtained by neutralyzing or partially neutralyzing those in the form of free acids. Among these, preferred is direct copolymerization.

Copolymerisation may be performed by any known method, such as bulk, solution, emulsion, precipitation and suspension polymerizations, using known polymerization techniques, including radical polymerization with use of radical initiators, thermal-, photo- and ionic-polymerization techniques. In view of performance of the resulting polymers, preferred is polymerization in aqueous medium, particularly aqueous solution polymerization. Procedure and conditions of aqueous solution polymerization are not particularly restricted, but it is preferred to carry out the polymerization at a pH of 6-7 in order to obtain polymers of high performance. Any known catalysts can be used, for example, water-soluble azo catalysts, such as azobisamidinopropane salts, azobiscyanovaleric acid and salts thereof, and the like; oil-soluble azo catalysts, such as azobisisovaleronitrile, azobisisobutyronitrile and the like; water-soluble peroxides, such as hydrogen peroxide, peracetic acid and the like; oil-soluble organic peroxides, such as benzoyl peroxide, cumene hydroperoxide and the like; inorganic peroxides, including persulfates, such as potassium persulfate, ammonium persulfate and the like; and redox catalysts: combinations of peroxides and reducing agents, such as sodium persulfate-sodium hydrogen sulfite, hydrogen peroxide-ferrous chloride, benzoyl peroxide-N,N-dimethyl aniline, and the like. These azo catalysts, peroxides and redox catalysts may be used in combination. Among these catalysts, preferred are azo catalysts, and particularly combinations thereof with redox catalysts, to obtain easily desired polymers. Copolymerization may be done stepwise: by polymerizing one or more monomers followed by polymerizing (grafting) one or more other monomers.

Modifications (hydrolysis, sulfoalkylation and neutralization) can be carried out in usual manners and conditions.

In order to attain the object of the present invention, it is critical that water-soluble copolymers of the invention have inherent viscosity of 10–25 dl/g, preferably 15–23 dl/g. It is also important for copolymers of the invention to have a viscosity (solution viscosity) of at least 10 cps (centipoises), preferably at least 15 cps, as measured at 25° C. in 0.2% by weight solution of the polyer in 1.5% by weight aqueous solution of calcium chloride. The inherent viscosity is measured at 30° C. in 1N $NaNO_3$, and the viscosity is measured using Brookfield viscometer equipped with BL adapter at shear rate of 7.2 $sec^{-1}$. Polymers having inherent viscosity and viscosity outside the above ranges are of poor utility, because of insufficient viscosity-increasing properties, or liability to cause plugging in oil-bearing formation. Polymers of the invention generally have a molecular weight of about 5,000,000 to about 30,000,000.

Copolymers of the present invention have improved viscosity-increasing property and other properties, and are particularly useful for enhanced oil recovery, such as the secondary recovery and tertiary recovery of petroleum.

In carrying out enhanced oil recovery using water-soluble copolymers according to this invention, any known methods may be employed, including polymer flooding and micellarpolymer flooding. Suitable methods include, for example, those described in U.S. Pat. Nos. 2,827,964, 2,842,492, 3,002,960, 3,039,529, 3,804,173, and 3,858,652.

Water, used for dissolving polymers of this invention, is not particularly limited, but wide range of water may be used. There is no need of using water of high purity, and water easily obtained in situ or near the oil field; because sufficient effects can be attained even when is used water containing polyvarent metal ions in a large amount, such as 0.1–0.3% by weight calculated as metal chlorides. Concentration of polymer in aqueous solution is usually 0.001 to 0.2% by weight, preferably 0.01 to 0.15%.

In using for enhanced oil recovery, polymers of the invention may be used in combination with other additives. Examples of suitable additives are inorganic salts, such as sodium carbonate, potassium carbonate, ammonium carbonate, sodium sulfate, ammonium sulfate and the like; organic acid salts, such as sodium acetate, sodium lactate, and the like; surfactants, such as polyoxyethylene nonylphenyl ether, sodium salt of dioctyl sulfosuccinate and the like; water-soluble polymers, such as polyethyleneoxide and the like; and stabilizers, such as hydroquinone, catechol, guanidine sulfate, thiourea and the like. Among these, preferred is thiourea, which may be added to solid polymer or aqueous solution thereof and are particularly effective for prevention of oxidative degradation of aqueous polymer solution. Amounts of these additives are generally at most 20%, preferably at most 10%, based on the weight of the polymer.

Oil-bearing formations, to which enhanced oil recovery by flooding of polymers according to the invention is applied, are not particularly restricted. Exemplary of such formations are those of sandstone and those of limestone, which have a permeability of usually 10 millidarcies or more, preferably 50 millidarcies or more.

Flooding of oil deposits with water containing polymers of the invention can be performed by conventional flooding procedure. For instance, a flooding medium comprising an aqueous polymer solution is introduced into an input well penetrating a subterranean oil-bearing formation and forced through the formation towards at least one output well penetrating the formation at a distance from the input well. Conventional polymer flooding and micellar- polymer flooding techniques as well as combinations thereof with other known techniques, such as channelling block technique, may also be applied.

Water-soluble copolymers of the present invention display considerably improved viscosity-increasing property, as used in pusher fluid injected into oil-bearing strata; and the viscosity-increasing property is maintained at high level without being affected by mechanical shearing and by impurities in water. In addition, copolymers of the invention have improved chemical stability, retention and other properties in oil-bearing formations, and can make it possible to increase the yield of oil efficiently and economically, as compared with known polymers.

Having generally described the invention, a more complete understanding can be obtained by reference to certain specific examples, which are included for purpose of illustration only and are not intended to be limiting unless otherwise specified.

EXAMPLES 1 to 3 and COMPARATIVE EXAMPLES 1 to 4

Into a reaction vessel equipped with an agitator, were charged acrylamide (hereinafter referred to as AAm), sodium acrylate (hereinafter referred to as NaA) and/or AMPS, composition of these monomers being shown in TABLE 1; and deionized water was added to form 15% by weight solution of the these monomers, followed by adjusting pH to 6.5 and the temperature to 40° C. Then, to the monomer solution, was added 10% by weight aqueous solution of sodium azobisycanovalerate, in an amount of 0.1% of the initiator based on the weight of the monomers, with stirring under an atmosphere of nitrogen. After about one minute, there was observed heat generation according to commencement of polymerization, and the reaction mixture was maintained at a temperature not more than 50° C. for 10 hours, cooling from outside. Subsequently, the mixture was heated to 70° C. for an hour to complete polymerization. (In the course of the polymerization, stirring was ceased when the mixture became too viscous to be stirred.)

After completion of polymerization, the resulting mixture was taken out of the reaction vessel, and added to a larger amount of methanol and stirred to obtain a powdery polymer. The yield was not less than 99.8%.

Properties of the polymers thus obtained were as shown in TABLE 1. Polymers of EXAMPLES 1 to 3 exhibited higher screen factors in water and in brine and higher viscosity-increasing properties than those of COMPARATIVE EXAMPLES 1 to 4.

TABLE 1

|  | Monomer used (mole %) | | | Properties of polymer | | | |
|---|---|---|---|---|---|---|---|
|  | | | | Inherent viscosity (dl/g) | Brookfield viscosity (cps) | Screen factor* | |
|  | AAm | NaA | AMPS | | | In deionized water | In brine |
| Example 1 | 77 | 16 | 7 | 18.3 | 25 | 45 | 40 |
| Example 2 | 77 | 19 | 4 | 21.0 | 30 | 60 | 58 |
| Example 3 | 77 | 21 | 2 | 20.5 | 27 | 51 | 47 |
| Comparative Example 1 | 77 | 23 | 0 | 20.7 | 20 | 38 | 11 |
| Comparative Example 2 | 77 | 0 | 23 | 17.2 | 15 | 29 | 19 |
| Comparative Example 3 | 77 | 11.5 | 11.5 | 18.1 | 17 | 23 | 15 |
| Comparative Example 4 | 77 | 16 | 7 | 15.0 | 8 | 27 | 18 |

Note:
*measured by passing through a screen of 200 mesh, at 25° C., 0.06% by weight polymer solution dissolved in deionized water or in brine containing 3% of sodium chloride and 1% of calcium chloride.

EXAMPLE 4 and COMPARATIVE EXAMPLE 5

A cylindrical core of Berea sandstone having a length of 7 cm and a diameter of 3.8 cm was mounted in a core holder designed so as to pass fluid through the core axially. The above core was saturated, under reduced pressure, with a brine containing 3% by weight of sodium chloride and 1% by weight of calcium chloride, and then flooded with petroleum having API gravity of 28 and viscosity of 26 cps at 25° C. until no further brine was driven out.

Subsequently, 1 PV (pore volume) of a 0.05% by weight aqueous solution of the polymer of EXAMPLE 1 or COMPARATIVE EXAMPLE 1 was introduced into the core. Further, 1 PV of the same brine as above was injected, and oil recovery factor was determined.

By using the polymer of EXAMPLE 1, there was attained such a high oil recovery factor of 61% (EXAMPLE 4); while use of the polymer of COMPARATIVE EXAMPLE 1 resulted in oil recovery factor of 40% (COMPARATIVE EXAMPLE 5).

Properties of the core used in the above experiments were as follows:

| Pore Volume | 19.5–19.7 | cm$^3$ |
|---|---|---|
| Porosity | 24.1–24.3% | |
| Permeability | 473–485 | md |
| Oil Saturation | 70–71% | |

What is claimed as new and desired to be secured by Letter Patent is:

1. A water-soluble copolymer useful for enhanced oil recovery, which has improved mechanical shear stability and improved viscosity-increasing properties, consisting essentially of:
at least one copolymerized unit (a) of the formula:

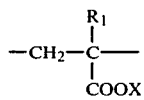 (1)

wherein $R_1$ is H or methyl and X is a counter cation;
at least one copolymerized unit (b) of the formula:

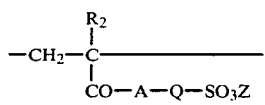 (2)

wherein $R_2$ is H or methyl, A is NH or O, Q is a divalent hydrocarbon radical containing at least four carbon atoms and Z is a counter cation; and
at least one copolymerized unit (c) of the formula:

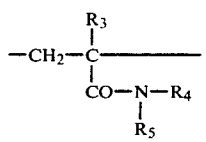 (3)

wherein $R_3$, $R_4$ and $R_5$ are, independently H or methyl, said copolymer containing 10–30 mole % of said unit (a), 1–10 mole % of said unit (b) and 60–89 mole % of said unit (c) and having an inherent viscosity of 10–25 dl/g.

2. The copolymer of claim 1, which has a viscosity of at least 10 cps, as measured at 25° C. in 0.2% by weight solution of the polymer in 1.5% by weight aqueous solution of calcium chloride.

3. The copolymer of claim 1, wherein said hydrocarbon radical is selected from the group consisting of $C_4$–$C_8$ aliphatic hydrocarbon radicals, $C_4$–$C_{10}$ alicyclic hydrocarbon radicals and $C_6$–$C_{15}$ aromatic hydrocarbon radicals.

4. The copolymer of claim 1, wherein said hydrocarbon radical is represented by the formula:

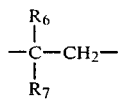

wherein $R_6$ is an alkyl radical containing 1–4 carbon atoms and $R_7$ is an alkyl radical containing 1–4 carbon atoms or an aryl radical, wherein the carbon atom substituted with $R_6$ and $R_7$ is linked to A and the methylene radical is linked to $SO_3Z$ in the general formula (2).

5. The copolymer of claim 4, wherein $R_6$ and $R_7$ are methyl radicals.

6. The copolymer of claim 1, wherein said unit (b) is derived from at least one monomer selected from the group consisting of 2-acrylamido-2-methyl-propane sulfonic acid, 2-methacrylamido-2-methyl-propane sulfonic acid, p-acryloyloxymethyl-benzene sulfonic acid and p-methacryloyloxymethylbenzene sulfonic acid.

7. The copolymer of claim 1, wherein Z is selected from the group consisting of hydrogen, alkali metals, ammonium and lower organic amine cations.

8. The copolymer of claim 1, wherein X is selected from the group consisting of hydrogen, alkali metals, ammonium and lower organic amine cations.

9. The copolymer of claim 1, which contains up to 20 mole % of at least one additional copolymerized unit (d) derived from at least one copolymerizable monoethylenically unsaturated monomer selected from the group consisting of hydrocarbons, esters, amides, nitriles, alcohols, ethers, halides, carboxylic acids, carboxylates, sulfonic acids and sulfonates.

10. The copolymer of claim 9, wherein said monomer is at least one selected from the group consisting of olefines, styrene, alkyl-substituted styrenes, vinyl esters, alkyl acrylates, alkyl methacrylates, hydroxyalkyl acrylates, hydroxyalkyl methacrylates, acrylonitrile and vinyl pyrrolidone.

11. A process for producing a water-soluble copolymer according to claim 1, which process comprises copolymerizing
(A) 10–30 mole % of at least one monomer of the formula:

 (4)

wherein $R_1$ is H or methyl radical and X is a counter cation;
(B) 1–10 mole % of at least one monomer of the formula:

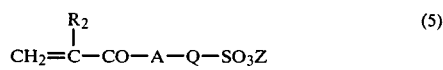 (5)

wherein $R_2$ is H or methyl radical, A is NH or O, Q is a divalent hydrocarbon radical containing at least four carbon atoms and Z is a counter cation; and
(C) 60–89 mole % of at least one monomer of the formula:

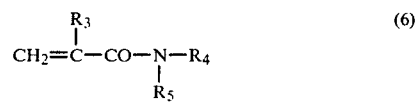 (6)

wherein $R_3$, $R_4$ and $R_5$ are, independently, H or methyl.

12. The process of claim 11, wherein, in addition to said monomers (A), (B) and (C), the monomer mixture contains up to 20 mole % of at least one copolymerizable monoethylenically unsaturated monomer which is selected from the group consisting of hydrocarbons, esters, amides, nitriles, alcohols, ethers, carboxylic acids, carboxylates, sulfonic acids and sulfonates.

13. The process of claim 11, wherein polymerization is carried out in aqueous medium.

14. The process of claim 11, wherein at least one precursor of any of said monomers (A), (B) and (C) is copolymerized, followed by modifying the resulting copolymerized unit of the precursor into copolymerized unit of any of the monomers (A), (B) and (C).

15. The copolymer of claim 1 or 2, which is dissolved in water in an amount effective for enhanced oil recovery.

16. The copolymer of claim 1 or 2, which is dissolved in an amount of 0.001–0.2% by weight.

17. A process for increasing the yield of oil upon flooding oil deposits with water containing the copolymer of claim 1 or 2.

18. The copolymer of claim 1, wherein the inherent viscosity of said water-soluble copolymer ranges from 15–23 dl/g.

19. The copolymer of claim 1, wherein the monomer which gives rise to unit (b) in said water-soluble copolymer is 2-(meth)acrylamido-2-methylpropane sulfonic acid or a salt thereof.

20. The copolymer of claim 1, which has a molecular weight of 5,000,000 to 30,000,000.

21. The process of claim 11, wherein said monomer (b) is 2-(meth)acrylamido-2-methylpropane sulfonic acid or a salt thereof.

* * * * *